April 4, 1961  J. R. MEYER-ARENDT  2,977,847
OPTICAL SYSTEM FOR MICROSCOPES OR SIMILAR INSTRUMENTS
Filed April 29, 1957

INVENTOR
Jurgen R. Meyer-Arendt

BY W. S. Rambo

ATTORNEY

United States Patent Office 2,977,847
Patented Apr. 4, 1961

2,977,847

OPTICAL SYSTEM FOR MICROSCOPES OR SIMILAR INSTRUMENTS

Jurgen R. Meyer-Arendt, Columbus, Ohio, assignor, by mesne assignments, to The Ohio State University Research Foundation, Columbus, Ohio, a corporation of Ohio Filed Apr. 29, 1957, Ser. No. 655,550

2 Claims. (Cl. 88—39)

This invention relates generally to optical systems or apparatus used in the refractometric measurements of particles of matter, and more particularly to an improved optical system used in the determination or calculation of the dry mass, refractive gradient and mass concentrations of microscopic particles or bodies.

In the past, in histochemical and cytochemical studies dealing with the growth and development of cells and tissues, the determination or calculation of the refractive gradient or index, protein concentration and dry mass of microscopic particles or organisms has been accomplished with the aid of so-called interference-type microscopes. However, interference-type microscopes of known type are extremely complex in their construction and operational principles and consequently are comparatively expensive. These instruments or microscopes utilize the principle of optical interference, wherein a light beam is divided into two parts through the use of a beam splitter, with one part of the split beam being reflected off of, or transmitted through, the specimen to be examined, with the other part of the beam being reflected at a comparison surface, or passed through a so-called blank, and then the two parts of the split beam are recombined so as to interfere with one another in a manner producing interference fringes or other types of interference patterns.

In addition to the relatively high costs of interference microscopes, the same oftentimes require in their use special specimen preparation techniques, mounting mediums and cover slips, thereby complicating and making more laborious and costly the ultimate determination or calculation of the physical characteristics of the specimen under examination.

Accordingly, it is the primary object of this invention to provide an improved and comparatively simplified and economical optical sysem for use in the refractometric measurements of microscopic particles or bodies, and one which may be readily and easily incorporated in present day, standard types of microscopes without necessitating extensive structural modification to such instruments.

Another object of the present invention is to provide a microscope for use in the refractometric measurements of bodies which utilizes solely the principles of geometric optics, and one which does not rely upon the relatively complex principles of optical interference or phase-altering phenomena which characterize the heretofore known, interference-type microscopes.

A further object of the present invention is to provide an optical system for a microscope or similar optical instrument which makes use of a relatively simple and inexpensive schlieren grating, composed of alternately arranged, parallel or concentric, light-absorbing and light-transmissive areas, interposed along the optical axis of a microscope between the eyepiece and objective thereof, together with a structurally simple, light-slit-defining diaphragm member positioned between a light source and the condenser of the microscope, the schlieren grating and diaphragm member serving to project a background pattern, consisting of a number of relatively closely spaced, parallel lines, superimposed upon the image of a specimen viewed through the eyepiece of the microscope, with the differential in refractive gradient between the specimen and its mounting media being indicated by a positional deviation or distortion of the lines of the background pattern which lie within the outline of the specimen image relative to the lines of the background pattern lying outside of the specimen image.

For a further and more complete understanding of the present invention and the various additional objects and advantages thereof, reference is made to the following description and the accompanying drawing, wherein.

Figure 1:
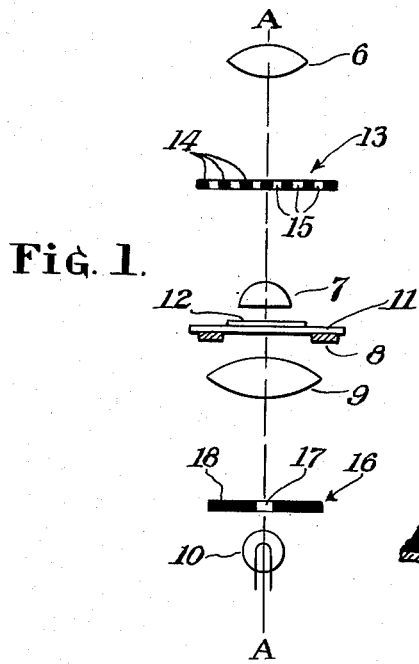
Fig. 1 is a diagrammatic view of the optical system of a microscope utilizing the principle of transmittent light and embodying the present invention.

Referring to Fig. 1 of the drawing, there is illustrated a transmittent light-type optical system formed in accordance with the present invention. The numeral 6 designates the eyepiece lens which is mounted, in the usual manner, in the upper outer end of the tubular casing or housing of the microscope, not shown. The optical system further embodies the usual objective lens 7, mounted in spaced relation to the eyepiece 6 and along the optical axis A—A, a specimen-supporting stage 8, a condenser 9, and a light source in the form of an incandescent electric ligth bulb 10. In the usual manner, the stage 8 is adapted to support a specimen to be examined along the optical axis of the instrument and such specimen may be mounted upon the usual glass slide 11 and covered by a cover slip 12.

Figure 2:
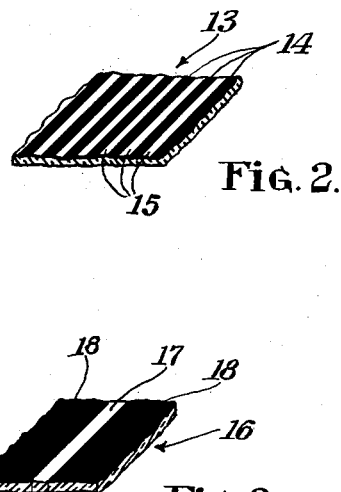
Fig. 2 is an enlarged, fragmentary perspective view of the schlieren grating member employed in the present optical system.

In accordance with the present invention, there is mounted along the optical axis of the microscope, between the eyepiece 6 and the objective 7, a schlieren grating member 13. As shown in Fig. 2, the grating member 13 may, advantageously, take the form of a transparent glass plate to one or more surfaces of which is applied a system of Ronchi or Lenouvel rulings consisting of a multiplicity of rather narrow and closely spaced, light-absorbing, opaque, parallel lines or linear areas 14. The light-absorbing lines or areas 14 are so arranged as to provide therebetween a series of clear, transparent, light transmissive lines or linear areas 15 of equal width. Preferably, the width of the lines 14 are such as to provide approximately 150–200 lines per inch. Alternatively, the grating member 13 may be formed from an opaque sheet material, such as a metal which is provided with a multiplicity of spaced parallel, light-transmissive, open slits corresponding to the light transmissive areas 15. Also, if desired, the light-absorbing areas 14 may be replaced by equivalent phase-shifting or phase-altering areas and are not necessarily restricted to a linear configuration, but may consist of a multiplicity of concentrically spaced, parallel curves or circles. For convenience, the schlieren grating member 13 is preferably mounted in the tubular casing of the microscope approximately midway between the eyepiece 6 and the objective 7, although the exact position of the grating member between the eyepiece and objective is not critical to the desired operation of the microscope and may be varied if so desired. In this regard, when the grating member is positioned relatively close to the back focal plane of the objective, the shadow image of the grating lines appear greatly enlarged and the sensitivity of the instrument reaches its maximum, but sharpness of the shadow image is reduced. Conversely, when the grating member is positioned relatively close to the eyepiece, the shadow lines are cast at a maximal sharpness, but sensitivity of the instrument is reduced.

Figure 3:
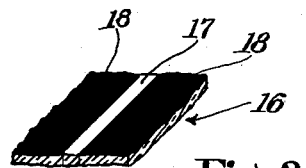
Fig. 3 is a similar view of the light-slit-defining diaphragm member employed in the present optical system.

Mounted between the light source 10 and the condenser 9 of the microscope is a light-slit-defining diaphragm 16 which, as illustrated in Fig. 3, may be constituted by a glass plate formed with a single narrow, transparent or light-transmissive slit, line or linear area 17 bounded on either side thereof by opaque areas 18. Alternatively, the slit-type diaphragm 16 may be replaced by the well-known adjustable iris-type diaphragm, not shown, or any equivalent device which is capable of producing, in combination with the condenser and lens system of the microscope, a substantial point of light along the optical axis below the grating member 13.

In mounting the slit diaprahgm 16, provision should be made for rotational adjustment thereof about the optical axis of the microscope for a purpose which will be hereinafter explained.

Alternatively, provision may be made in the mounting of the grating member 13 to permit of rotative adjustment thereof about the optical axis of the microscope, in addition to or in lieu of rotative adjustment of the diaphragm 16.

In the operation of the transmittent light system disclosed in Fig. 1, light beams emanating from the light source 10 are transmitted first through the slit 17 of the diaphragm 16, the condenser 9, through the specimen supported by the stage 8, the objective 7, the light-transmissive area 15 of the schlieren grating 13 and through the eyepiece 6 to the eye of the viewer or to a camera, in the case photomicrographs are desired. When it is desired to make the usual visual microscopic examination upon a specimen, the slit diaphragm 16, or the grating member 13, may either be removed from their positions along the optical axis of the instrument, or rotatively adjusted, so as to move the light-transmissive slit 17 of the diaphragm 16 out of parallel relation to the light-transmissive slits or areas 15 of the schlieren grating member 13. For example, when a perpendicular relation exists between the slit 17 of the diaphragm and the slits 15 of the grating member, the lines of the grating member are not discernible in the microscopic field and the image of the specimen appears in the usual manner. However, by bringing the slit 17 of the diaphragm into parallelism with the slits or stripes of the grating member 13, the shadow of the opaque or light-absorbing areas 14 of the grating member is projected to the eyepiece 6 and superimposed on the image of the specimen, thus producing an overall image similar to that shown in Fig. 4. In this regard, it will be understood that when the slit of the diaphragm 16 is disposed in parallel relation to the slits or lines of the grating member 13, the slit diaphragm acts as a point-like light source and thus casts shadows of the opaque lines of the grating member. However, for example, when the slit of the diaphragm is disposed perpendicular to the lines of the grating member, no shadows of the opaque lines of the grating member are discernible. This is best explained by stating that the light rays passing through the slit of the diaphragm 16 are made parallel by the condenser 9 and pass in such parallel arrangement through the specimen and into the front lens of the objective 7. The parallel rays are then combined in the back focal plane of the objective where a small, well defined image of the slit is formed. This image, itself, acts as a new (secondary) light source which takes the form of a luminous slit approximately the same, or of slightly larger width than the distances between the opaque lines of the grating member 13. The rays produced from this luminous slit, when arranged perpendicular to the lines of the grating member, cast no discernible shadows of the lines of the grating member.

Figure 4:
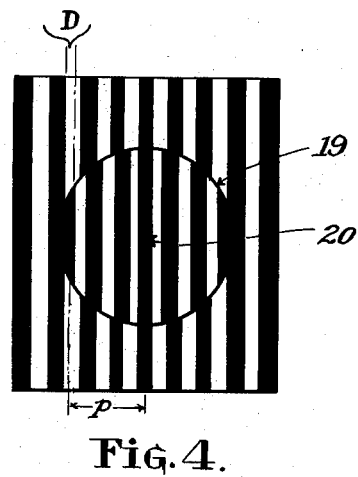
Fig. 4 is a plan view of a photomicrograph of the image of a spherical microscopic body or particle having a refractive index different from its surroundings as viewed through a microscope formed in accordance with this invention.

As will be seen by reference to Fig. 4 of the drawing, the parallel lines or shadows which lie within the boundary or outline 19 of the specimen image are displaced or deviated laterally relative to the lines or shadows which lie outside the specimen image by a distance D. This lateral displacement or deviation is caused by the difference in the thickness and/or refractive gradient of the specimen and its ambient mounting medium. This lateral displacement or deviation becomes more pronounced in the lines or shadows disposed at the outer lateral boundaries of the specimen image, that is, those lines lying within the boundary 19, but farthest removed laterally from the geometrical center 20 of the specimen image. The amount of such deviation D as well as the distance $p$ from the geometrical center 20 of the specimen image to the particular displaced line may be measured accurately through the use of a microdensitometer, and thereafter, through the use of known mathematical equations, various physical properties of the specimen may be calculated or determined, such as, its refractive gradient, mass concentrations and total dry or anhydrous mass.

Figure 5:
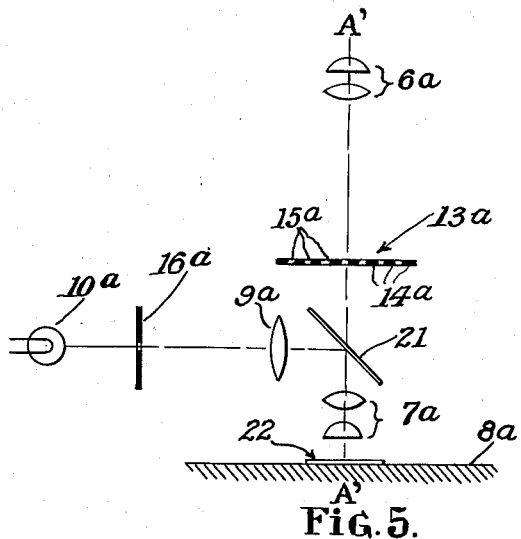
Fig. 5 is a digrammatic view of a modified optical system for a microscope utilizing an incident light principle and formed in accordance with this invention.

Fig. 5 of the drawing illustrates a modified-type of optical system formed in accordance with the present invention and one which may be employed in a microscope or similar instrument used in the examination of the surfaces of opaque objects or specimens, wherein light rays or beams from a given light source or sources are projected into the focal plane of the instrument at an angle to the optical axis of the instrument other than a straight angle. An optical system of the type shown in Fig. 5 is ordinarily referred to in microscopy as an incident light system.

In this latter figure, the numeral 6a designates the eyepiece of the instrument, the numeral 7a, the objective lens or lenses, and the numeral 8a, the specimen-supporting stage. In this instance, light rays or beams emanating from a light source 10a are transmitted through the condenser 9a to a mirror 21 at an angle to the optical axis A'—A' of the instrument and are reflected generally downwardly upon the upper surface of an opaque specimen 22 supported on the stage 8a to illuminate the surface of the specimen to be examined.

As in the transmittent light system disclosed in Fig. 1, the incident light system shown in Fig. 5 embodies a schlieren grating member 13a positioned between the eyepiece 6a and the objective 7a along the optical axis A'—A' of the instrument. The schlieren grating 13a may take the identical form of the grating 13 shown in Fig. 1 and comprises the alternately arranged light-absorbing and light-transmittent lines or areas 14a and 15a respectively. Also, the incident light system of Fig. 5 makes use of a light-slit-defining device, such as the slit diaphragm member 16a positioned between the light source 10a and the condenser 9a, the slit diaphragm member 16a being preferably removable or rotationally adjustable in the same manner as that previously described in reference to the member 16 used in the transmittent light system shown in Fig. 1.

The incident light system shown in Fig. 5 is intended for use in the surface examination and/or measurement of opaque bodies or specimens such as metals, and the schlieren grating member 13a and slit diaphragm 16a may readily and easily be incorporated into the usual types of incident light microscopes without involving any extensive or expensive structural modifications thereof. In the operation of the incident light system shown in Fig. 5, if the reflecting surface of the mirror is arranged so as to reflect the light rays from the condenser downwardly at exactly a 45 degree angle relative to the optical axis A'—A', only an image of a light slit, corresponding to the slit of the diaphragm member 16a, appears in the microscopic field and none of the lines or stripes of the grating member 13a are discernible. However, merely by changing the angle of the reflecting surface of the mirror 21 slightly in either direction, the typical schlieren pattern becomes visible in the microscopic field. If the surface of the test specimen 22 is perfectly plane, the shadows produced by the light-absorbing lines or areas 14a of the grating 13a will appear as a system of straight, undistorted lines, whereas, if any irregularities are present on the surface of the specimen 22, the image of the lines corresponding to such irregularities become deviated or displaced relative to the same lines whose shadows are cast by light reflected from a planar comparison surface. Thus, the amount of deviation of the line images may be used in mathematical equations or formulae to gain valuable knowledge of certain of the physical characteristics or qualities of the specimen.

The light sources, represented by the incandescent electric light bulbs 10 and 10a, used in connection with the present optical systems are preferably monochromatic, in order to minimize blurring of the image due to color dispersion effects which would take place through the use of a polychromatic light source, although the optical effects seen are, as contrasted to interference microscopy, entirely independent of the wavelength of the light used.

In view of the foregoing, it will be seen that the present invention provides a mechanically simple, yet efficient optical system for microscopes or similar instruments which utilizes purely geometrical optical principles in the refractometric measurements and mass determinations of transparent or translucent particles or bodies and in the surface measurements of opaque bodies or materials. The present optical system is further characterized by the ease and economy with which the same may be incorporated within existing, present-day types of microscopes without necessitating extensive and costly modifications to such instruments.

While certain preferred embodiments of the present invention have been shown and described in detail, it will be understood that various modifications or changes in design and details of construction may be resorted to without departing from the spirit of the invention or the scope of the following claims.

I claim:

1. In a microscope having an eyepiece, an objective lens and a specimen-supporting stage arranged in relatively spaced relation to one another and defining an optical axis for said microscope, and a light source and condenser disposed in relatively spaced relation to one another and arranged normally to project light rays into the optical field of said microscope; that improvement which comprises a body positioned between said light source and said condenser and provided with a narrow light-transmissive slit arranged to define a substantial pinpoint source of light for passage through said condenser and into the optical field of said microscope, in combination with a schlieren grating positioned along the optical axis of said microscope between the eyepiece and objective lens thereof and having alternating light-absorbing and light-transmissive areas thereon adapted to superimpose a plurality of finite lines upon an image of a specimen viewed through the eyepiece of said microscope.

2. The combination defined in claim 1, wherein said body and said schlieren grating are rotatively adjustable relative to one another to a position at which the alternating light-absorbing and light-transmissive areas of said grating are indiscernible when viewing an image of a specimen through the eyepiece of said microscope.

References Cited in the file of this patent

UNITED STATES PATENTS

| | | |
|---|---|---|
| 2,541,437 | Prescott | Feb. 13, 1951 |
| 2,720,810 | Senn | Oct. 18, 1955 |
| 2,858,728 | Jonnard | Nov. 4, 1958 |